United States Patent [19]
Yoshikawa et al.

[11] Patent Number: 6,166,684
[45] Date of Patent: Dec. 26, 2000

[54] ARTIFICIAL SATELLITE NAVIGATION SYSTEM AND METHOD

[75] Inventors: Shoji Yoshikawa; Katsuhiko Yamada; Hiroshi Koyama; Jun Tsukui, all of Tokyo, Japan

[73] Assignee: Mitsubishi Denki Kabushiki Kaisha, Tokyo, Japan

[21] Appl. No.: 09/268,129

[22] Filed: Mar. 15, 1999

[30] Foreign Application Priority Data

Apr. 28, 1998 [JP] Japan .................................. 10-118875

[51] Int. Cl.$^7$ .................................................. H04B 7/185
[52] U.S. Cl. .............................. 342/357.08; 342/357.06
[58] Field of Search ..................... 342/357.01, 357.06, 342/357.08; 701/213

[56] References Cited

U.S. PATENT DOCUMENTS

| | | |
|---|---|---|
| 5,265,025 | 11/1993 | Hirata . |
| 5,379,224 | 1/1995 | Brown et al. .......................... 364/449 |
| 5,398,034 | 3/1995 | Spilker .................................... 342/357 |
| 5,543,804 | 8/1996 | Buchler et al. .......................... 342/357 |
| 5,757,317 | 5/1998 | Buchler et al. . |

OTHER PUBLICATIONS

Nishimura et al.; "Guidance and Control in the Aerospace", Association of Instrumentation and Automatic Control, pp. 255–260, and 273–275, Nov. 30, 1995. (Partial English Translation).

*Primary Examiner*—Thomas H. Tarcza
*Assistant Examiner*—Dao L. Pham
*Attorney, Agent, or Firm*—Leydig, Voit & Mayer, Ltd.

[57] ABSTRACT

An artificial satellite navigation system and method. The artificial satellite navigation system includes a global positioning system (GPS) receiver, local satellite, and remote satellite absolute navigation units estimating the position and velocity of a local satellite or a remote satellite and bias and drift of a clock in the receiver. A difference calculation unit calculates differences in position and velocity from the local satellite and remote satellite absolute navigation units. A relative navigation unit estimates the relative position and velocity of the local satellite with respect to the remote satellite. The relative navigation unit navigates the local satellite relative to the remote satellite.

14 Claims, 7 Drawing Sheets

ARTIFICIAL SATELLITE NAVIGATION SYSTEM AND METHOD

BACKGROUND OF THE INVENTION

1. Field of the Invention

The present invention relates to an artificial satellite navigation system and method for determining the position of a spacecraft such as an artificial satellite (hereinafter generically an artificial satellite) using the global positioning system (GPS).

2. Description of the Related Art

A GPS receiver inversely decodes a GPS signal received from a GPS satellite according to a PRN code, one kind of pseudo random numbers, and then interprets a navigation message. Moreover, the GPS receiver locks the phase of a carrier on to that of a reference signal. A time difference between the instant a GPS signal is transmitted and the instant the GPS signal is received is multiplied by a the velocity of light, whereby the distance between the GPS satellite and receiver is measured. The distance is analyzed in conjunction with the position of the GPS satellite which is detected from the navigation message, thus determining the position of the receiver.

A clock included in a GPS receiver owned by a user is not always precise. When a time difference between transmission and reception is measured, a bias caused by the clock is added as an error. For locating a user independently, simultaneous equations including four unknown variables are solved using observed quantities that are distances from four GPS satellites. This method is generally adopted except when a user stays on the sea. In this case, it is apparent that the altitude is equal to the sea level. The four unknown variables include the bias caused by the receiver clock and three degrees of freedom concerning position, that is, latitude, longitude, and altitude. Furthermore, since the phase of a carrier is locked on to a reference signal, a change in distance from each GPS satellite is observed. For calculating velocity, simultaneous equations having four variables are solved using observed quantities that are changes in distance from the four GPS satellites. The four variables include a drift caused by the receiver clock and the three parameters concerning position. The principles of locating a user independently using the GPS have been described above.

However, a GPS signal contains a natural error such as a delay of a signal occurring during passage through the troposphere or ionosphere, and an artificial error that is applied intentionally for the purpose of national security; such as, an SA error. The precision in location ensured by the foregoing method is therefore unsatisfactory for some usage. A relative navigation method referred to as a differential GPS (hereinafter DGPS), which will be described below, has been proposed for locating an entity on the Earth in the past. The location precision has thus improved. The basic ideas of the DGPS are to detect the position and velocity of one receiver (user) relative to another receiver (reference station). Common errors occurring in the receivers are canceled out. Eventually, the location precision improves.

Figure 7:
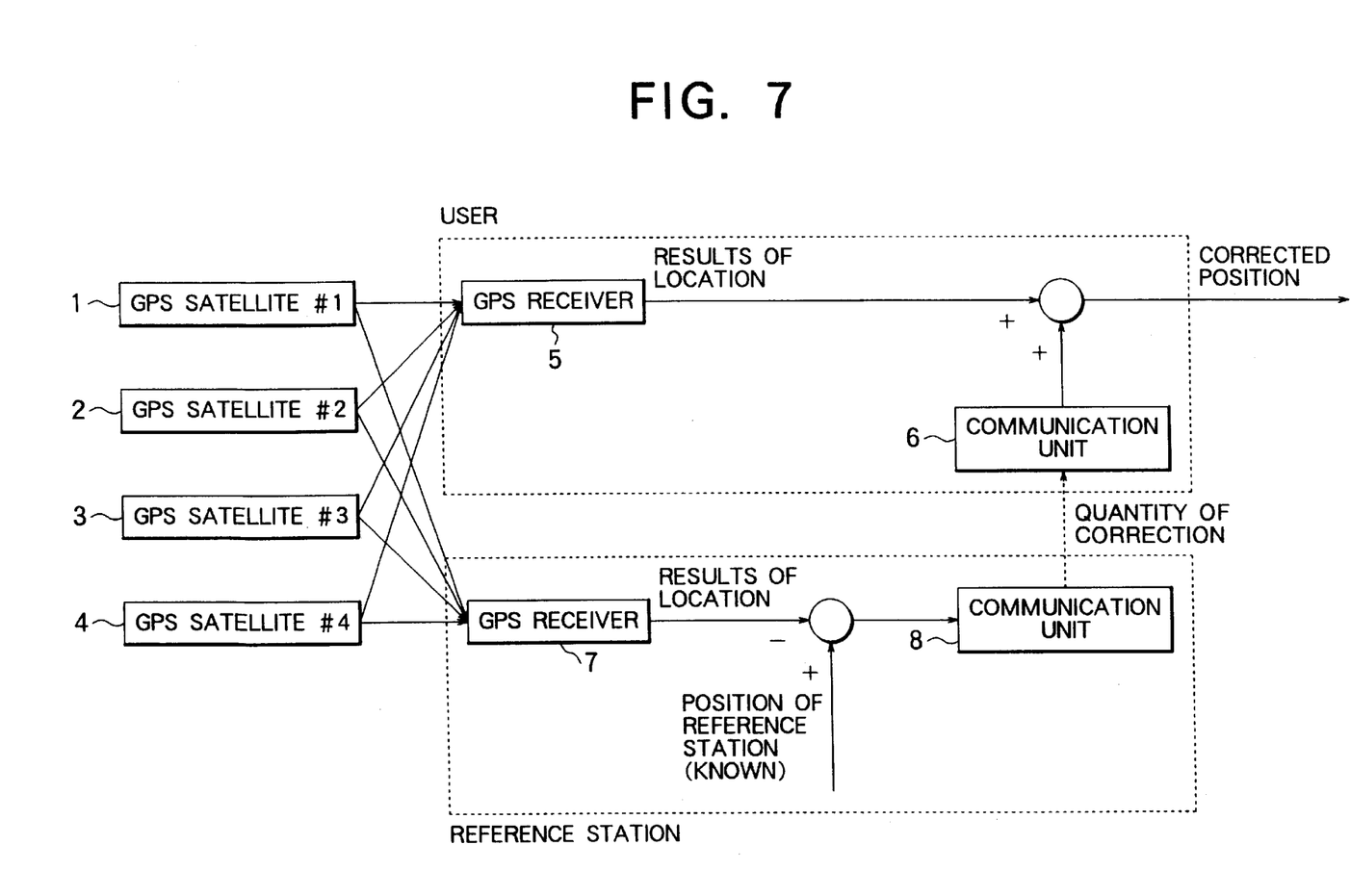
FIG. 7 is a block diagram showing the configuration of a conventional DGPS adaptable to the Earth.

Referring to FIG. 7, the DGPS will be described. FIG. 7 is a block diagram showing the configuration of a navigation system based on the DGPS adaptable to the Earth. The configuration has been revealed in the article entitled "Guidance and Control in the Aerospace" written by Nishimura et al. (Association of Instrumentation and Automatic Control, pp.255–260, 1995). In FIG. 7, GPS satellites 1, 2, 3, and 4 are visible in common from both a reference station and user. A user 5 or a GPS receiver owned by the user 5 is shown. A communication unit 6 helps the user receive data such as quantities of correction from the reference station. Moreover, there are shown a reference station 7 or a GPS receiver installed in the reference station, and a communication unit 8 helping the reference station transmit data such as the quantities of correction to users. For brevity's sake, the GPS receiver shall include a GPS antenna.

The receiver 7 to be installed in the reference station is placed at a site whose position is accurately known. Data observed by the receiver is used to calculate quantities of correction that explicitly or implicitly contain common errors occurring in the user 5 and reference station 7. The quantities of correction are transmitted as DGPS correction data from the communication unit 8 to the user 5 through radio-communication or the like. The user 5 adds the quantities of correction received through the communication unit 6 to the results of location that are calculated based on the observed data, thus improving precision in location. The errors occurring in common in the receivers, for example, a delay caused by the ionosphere, an error caused by the troposphere, and an SA error can be canceled.

Since the reference station 7 is installed on the Earth, the position thereof is usually specified accurately according to a system of coordinates fitted to the Earth, for example, in terms of latitude, longitude, and altitude. Based on the quantities of correction, the position of the user 5 can be determined highly precisely according to the same system of coordinates fitted to the Earth. Otherwise, since the quantities of correction are used in common by the user and reference station, the relative positions thereof can be determined highly precisely in consideration of differences between the results of locating them. Quantities of correction to be calculated at the reference station 7 may include quantities proportional to biases of GPS signals or quantities proportional to biases of the results of location provided using an appropriate combination of GPS satellites. The former biases are referred to as differences detected in an observation field while the latter biases are referred to as differences detected in a navigation field.

When the differences detected in the observation region are employed, the quantities of correction vary depending on GPS satellites. After a signal is corrected for each GPS satellite, parameters needed for location are calculated. When the differences detected in the navigation field are employed, the quantities of correction vary depending on a combination of four GPS satellites used for location. The results of calculations for location are corrected. In either case, the number of common GPS satellites must be four or more. The reference station 7 to be installed on the Earth is usually positioned at a clear site. As long as the user 5 stays at a clear site not too far from the reference station 7, the number of GPS satellites visible in common by the user and reference station will be four. The number of GPS satellites required by the DGPS is thus satisfied.

Now, a space station in the space will be regarded as a reference station (hereinafter called a target). An artificial satellite taking off from or landing on the space station will be regarded as a user (hereinafter called a chaser). The relative position of the chaser with respect to the target can presumably be estimated highly precisely by the DGPS. However, the DGPS adaptable to the Earth cannot be adapted to the space for the reasons described below.

To begin with, the target has numerous large accessories including a solar paddle and a radiating plane. The field of view offered by a GPS antenna is liable to be blocked.

Frequently three or fewer of the GPS satellites are visible in common by the target and chaser. Furthermore, both the target and chaser are moving at high speeds in space. For avoiding accidents including a collision, it is indispensable that the relative position or velocity of the chaser can be estimated any time. For this reason, the DGPS adaptable to the Earth and making it an indispensable requisite that four or more GPS satellites must be visible in common cannot be adapted to space.

A DGPS proposed for the space is described, for example, in "Guidance and Control in Aerospace" written by Nishimura et al. (Association of Instrumentation and Automatic Control, pp.273–275, 1995). Specifically, measurements are predicted based on a relative position and velocity predicted by integrating equations of motion that give the relative position of the chaser with respect to the target. The predicted values of the relative position and velocity are corrected according to the actual measurements (hereinafter, when it is stated that measurements are updated, it means that measurements are predicted and then corrected as mentioned above). In other words, the differences detected in the observation field are extended.

The Kalman filter composed of equations of motion and measurements is adopted as mentioned above. Even if the number of GPS satellites visible in common is less than four, measurements can be updated. When equations of motion giving a relative position are kept integrated, an error contained in an estimated value is integrated and expanded. Besides, measurements are affected by disturbances including air resistance and an aspherical component of the gravity of the Earth. The precision in measuring therefore deteriorates quickly with the passage of time. If four or more GPS satellites are visible in common, the precision in location will be improved by updating measurements. Even if the number of GPS satellites visible in common is less than four, deterioration of precision in location can be suppressed by updating measurements.

However, if the target is located very far from the chaser, no GPS satellite will be visible in common. The foregoing method cannot therefore be adopted for updating measurements. Moreover, biases and drifts caused by the clocks in the receivers of the chaser and target are a quantity estimated by the filter, that is, a state quantity provided by the filter. The characteristics of the receiver clock of the target causing bias and drift are not always known by the chaser. The filter is therefore tuned so that it can provide an estimated quantity large enough to compensate for the bias and drift. The filter cannot therefore be tuned optimally.

In the aforesaid conventional artificial satellite navigation system, even when the number of GPS satellites visible in common is less than four, differences are detected in an observation field so that measurements can be updated. A state quantity provided by a filler contains bias and drift caused by a clock included in a receiver of a target. The characteristics of the clock concerning the drift and bias are not always certain. This poses a problem in that the filter must be tuned so that the state quantity will be large enough to compensate for the drift and bias. Moreover, when no GPS satellite is visible in common, measurements cannot be updated. There arises a problem because the navigation system cannot be used to navigate an artificial satellite located far from the target.

SUMMARY OF THE INVENTION

The present invention attempts to solve the foregoing problems. An object of the present invention is to provide an artificial satellite navigation system and method that can be adapted to artificial satellites whose distances from a target vary from the longest to the shortest. Herein, equations of motion and measurements are used in combination in order to calculate the positions and velocities of a target and chaser. Differences detected in a navigation field are used in combination of equations of motion. Thus, when the number of GPS satellites visible in common by the target and chaser is four or more, the chaser can be located highly precisely. Even when the number of GPS satellites visible in common is less than four, including zero, deterioration of precision in location can be suppressed by updating measurements.

Accordingly, the present invention provides an artificial satellite navigation system comprising a GPS receiver, a communication unit, a local satellite absolute navigation unit, a remote satellite absolute navigation unit, a difference calculation unit, and a relative navigation unit. The GPS receiver receives GPS signals. The communication unit helps communicate with a remote satellite having a GPS receiver mounted therein. The local satellite absolute navigation unit inputs a signal from the GPS receiver, and estimates the position and velocity of a local satellite as well as a bias and drive caused by a clock in the GPS receiver. The remote satellite absolute navigation unit inputs a signal from the communication unit, and estimates the position and velocity of a remote satellite as well as a bias and drift caused by a clock in the GPS receiver. The difference calculation unit calculates differences in position and velocity from the output of the local satellite absolute navigation unit and the output of the remote satellite absolute navigation unit. The relative navigation unit estimates the relative position and velocity of the local satellite with respect to the remote satellite. The difference calculation unit outputs the differences that have been transformed into components expressed in a system of coordinates defined with reference to the orbit of the remote satellite. Based on the output of the difference calculation unit, the relative navigation unit navigates the local satellite relatively.

Moreover, the present invention provides an artificial satellite navigation system in which the local satellite absolute navigation unit and remote satellite absolute navigation unit each include an single positioning block and an initial value calculation block. The single positioning block calculates the position and velocity of the local or remote satellite as well as a bias and drift occurring in the receiver. The initial value calculation block calculates the initial values of these parameters. The initial value calculation block provides values, which are predicted by distributing the results of previous single positioning according to equations of motion, as the initial values of the parameters needed for single positioning.

Moreover, the present invention provides an artificial satellite navigation system in which the local satellite absolute navigation unit and remote satellite absolute navigation unit each include an single positioning block and an initial value calculation block. The single positioning block calculates the position and velocity of the local or remote satellite and a bias and drift occurring in the receiver in consideration of the positional relationships of the local or remote satellite to GPS satellites. The initial value calculation block calculates the initial values of these parameters. The single positioning block independently locates the local or remote satellite according to the output of the initial calculation unit and the output of the GPS receiver or communication unit.

Moreover, the present invention provides an artificial satellite navigation system in which the local satellite absolute navigation unit and remote satellite absolute navigation unit each include an single positioning block and an initial value calculation block. The single positioning block calculates the position and velocity of the local or remote satellite as well as a bias and drift occurring in the receiver. The initial value calculation block calculates the initial values of these parameters. The single positioning block uses a pseudo inverse matrix to calculate the parameters needed for single positioning.

Moreover, the present invention provides an artificial satellite navigation system in which the local satellite absolute navigation unit and remote satellite absolute navigation unit each include an single positioning block and an initial value calculation block. The single positioning block calculates the position and velocity of the local or remote satellite as well as a bias and drift occurring in the receiver. The initial value calculation block calculates the initial values of these parameters. When the number of GPS satellites visible in common by the local and remote satellites is less than four, the single positioning block simulates a signal to be received from a GPS satellite that is invisible actually. Thus, the number of GPS satellites visible in common is made apparently four. The single positioning block then locates the local or remote satellite independently.

Moreover, the present invention provides an artificial satellite navigation system further comprising a remote satellite absolute navigation inverse calculation unit. The remote satellite absolute navigation inverse calculation unit inversely calculates the position and velocity of the remote satellite from the output of the local satellite absolute navigation unit and the output of the relative navigation unit. The local satellite absolute navigation unit and remote satellite absolute navigation unit each include an single positioning block and an initial value calculation block. The single positioning block calculates the position and velocity of the local or remote satellite as well as a bias and drift occurring in the receiver. The initial value calculation block calculates the initial values of these parameters. The initial value calculation block in the remote satellite absolute navigation unit uses values provided by the remote satellite absolute navigation inverse calculation unit as the initial values of the parameters needed for single positioning.

Moreover, the present invention provides an artificial satellite navigation system further comprising a local satellite absolute navigation inverse calculation unit. The local satellite absolute navigation inverse calculation unit inversely calculates the position and velocity of the local satellite from the output of the remote satellite absolute navigation unit and the output of the relative navigation unit. The local satellite absolute navigation unit and remote satellite absolute navigation unit each include an single positioning block and an initial value calculation block. The single positioning block calculates the position and velocity of the local or remote satellite and a bias and drift occurring in the receiver. The initial value calculation block calculates the initial values of these parameters. The initial value calculation block in the local satellite absolute navigation unit uses values provided by the local satellite absolute navigation inverse calculation unit as the initial values of the parameters needed for single positioning.

Moreover, the present invention provides an artificial satellite navigation method adaptable to an artificial satellite that receives GPS signals through a GPS receiver thereof and communicates with a remote satellite having a GPS receiver mounted therein. The artificial satellite navigation method comprises a local satellite absolute navigation step, a remote satellite absolute navigation step, a difference calculation step, and a relative navigation step. At the local satellite absolute navigation step, the position and velocity of the local satellite and a bias and drift caused by a clock in the GPS receiver are estimated from a received GPS signal. At the remote satellite absolute navigation step, the position and velocity of the remote satellite and a bias and drift caused by a clock in the GPS receiver are estimated from a signal sent from the remote satellite. At the difference calculation step, differences in position and velocity are calculated from the results of the local satellite navigation step and those of the remote satellite navigation step. At the relative navigation step, the relative position and velocity of the local satellite with respect to the remote satellite are estimated from the differences in position and velocity. At the difference calculation step, the differences are transformed into components expressed in a system of coordinates defined with reference to the orbit of the remote satellite. Based on the results of the difference calculation step, the local satellite is navigated relatively at the relative navigation step.

Moreover, the present invention provides an artificial satellite navigation method in which the local satellite absolute navigation step and remote satellite navigation step each include an single positioning step and an initial value calculation step. The position and velocity of the local or remote satellite and a bias and drift occurring in the receiver are calculated at the single positioning step. The initial values of these parameters are calculated at the initial value calculation step. At the initial value calculation step, values predicted by distributing the results of previous single positioning according to equations of motion are used as the initial values of the parameters needed for single positioning.

Moreover, the present invention provides an artificial satellite navigation method in which the local satellite absolute navigation step and remote satellite absolute navigation step each include an single positioning step and an initial value calculation step. At the single positioning step, the position and velocity of the local or remote satellite and a bias and drift occurring in the receiver are calculated in consideration of the geometric positional relationships of the local or remote satellite to GPS satellites. The initial values of these parameters are calculated at the initial value calculation step. Based on the results of the initial value calculation step and the received GPS signal or a signal sent from the remote satellite, the local or remote satellite is located at the single positioning step.

Moreover, the present invention provides an artificial satellite navigation method in which the local satellite navigation step and remote satellite navigation step each include an single positioning step and an initial value calculation step. The position and velocity of the local or remote satellite and a bias and drift occurring in the receiver are calculated at the single positioning step. The initial values of these parameters are calculated at the initial value calculation step. At the single positioning step, a pseudo inverse matrix is used to calculate the parameters needed for single positioning.

Moreover, the present invention provides an artificial satellite navigation method in which the local satellite absolute navigation step and remote satellite absolute navigation step each include an single positioning step and an initial value calculation step. The position and velocity of the local or remote satellite and a bias and drift occurring in the receiver are calculated at the single positioning step. The initial values of these parameters are calculated at the initial value calculation step. At the single positioning step, when the number of GPS satellites visible in common by the local and remote satellites is less than four, a signal to be received from an actually invisible GPS satellite is simulated in order to make the number of GPS satellites visible in common apparently four. The local or remote satellite is then located independently.

Moreover, the present invention provides an artificial satellite navigation method further comprising a remote satellite absolute navigation inverse calculation step. At the remote satellite absolute navigation inverse calculation step, the position and velocity of the remote satellite are calculated inversely from the results of the local satellite absolute navigation step and the results of the relative navigation step. The local satellite absolute navigation step and remote satellite absolute navigation step each include an single positioning step and an initial value calculation step. The position and velocity of the local or remote satellite and a bias and drift occurring in the receiver are calculated at the single positioning step. The initial values of these parameters are calculated at the initial value calculation step. At the initial value calculation step within the remote satellite absolute navigation step, the values calculated at the remote satellite absolute navigation inverse calculation step are provided as the initial values of the parameters needed for single positioning.

Moreover, the present invention provides an artificial satellite navigation method further comprising a local satellite absolute navigation inverse calculation step. At the local satellite absolute navigation inverse calculation step, the position and velocity of the local satellite are calculated inversely from the results of the remote satellite absolute navigation step and the results of the relative navigation step. The local satellite absolute navigation step and remote satellite absolute navigation step each include an single positioning step and an initial value step. The position and velocity of the local or remote satellite and a bias and drift occurring in the receiver are calculated at the single positioning step. The initial values of these parameters are calculated at the initial value calculation step. At the initial value calculation step within the local absolute navigation step, the values calculated at the local satellite absolute navigation inverse calculation step are provided as the initial values of the parameters needed for single positioning.

DESCRIPTION OF THE PREFERRED EMBODIMENTS

The present invention will be described by presenting embodiments one by one below.

First Embodiment

Figure 1:
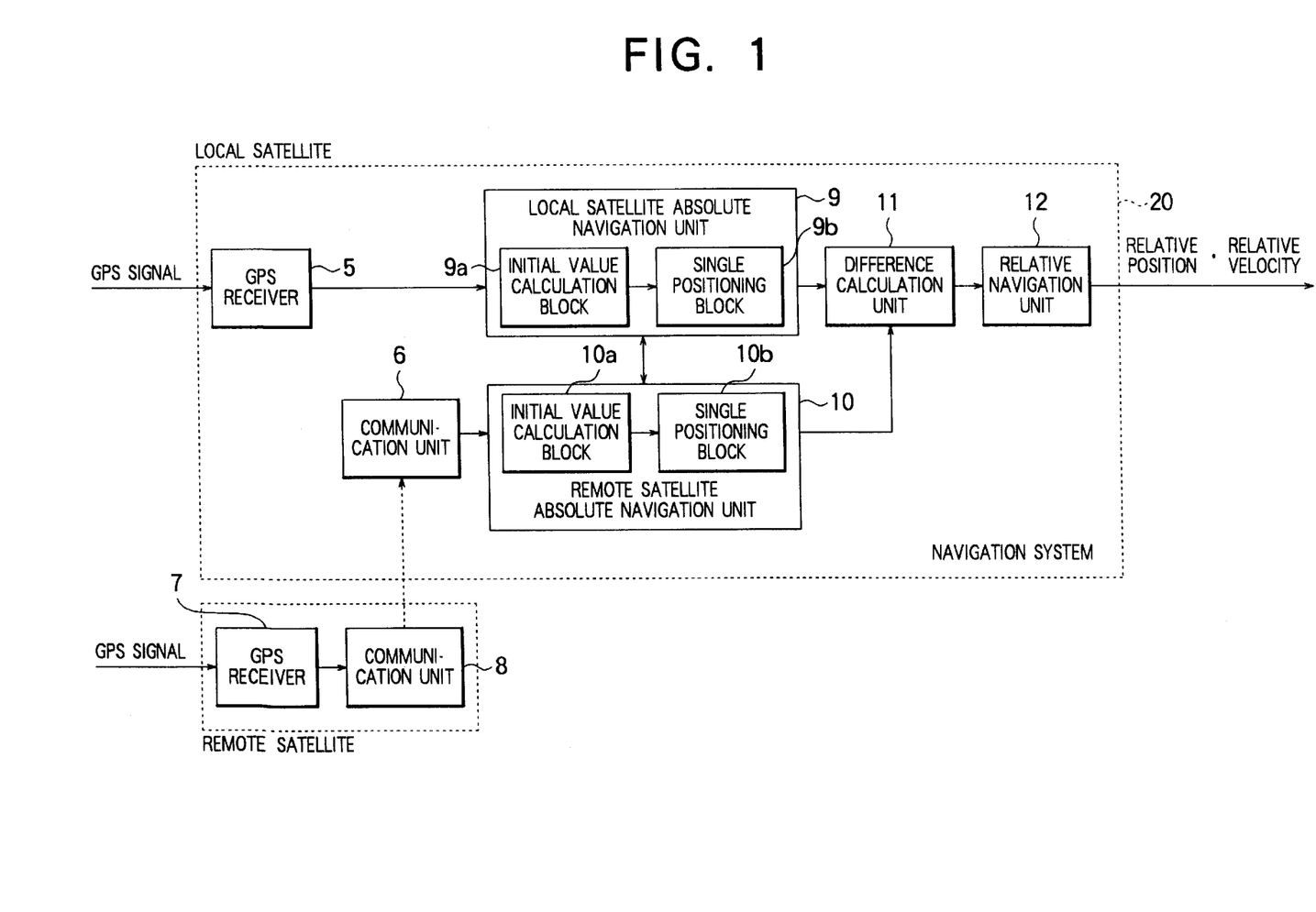
FIG. 1 is a block diagram showing the configuration of an artificial satellite navigation system in accordance with the first embodiment of the present invention.

FIG. 1 is a block diagram showing the configuration of an artificial satellite navigation system in accordance with an embodiment of the present invention. In the drawings, the same reference numerals denote components mutually identical or equivalent. Referring to FIG. 1, an artificial satellite navigation system 20 comprises a GPS receiver 5, a local satellite absolute navigation unit 9, an initial value calculation block 9a, and an single positioning block 9b. The GPS receiver 5 that is mounted in a local satellite receives GPS signals from GPS satellites, and outputs GPS data. The GPS data contains a reception time instant, the ephemerides of GPS satellites, the identification numbers of the GPS satellites, the pseudo distances thereof, and the delta ranges thereof. The local satellite absolute navigation unit 9 navigates the local satellite absolutely. The initial value calculation block 9a calculates the initial values of the parameters needed to navigate the local satellite absolutely. The single positioning block 9b performs arithmetic operations necessary to navigate the local satellite absolutely.

A communication unit 6 helps communicate with a remote satellite. A remote satellite absolute navigation unit 10 navigates the remote satellite absolutely. An initial value calculation block 10a calculates the initial values of the parameters needed to navigate the remote satellite absolutely. An single positioning block 10b performs arithmetic operations necessary to navigate the remote satellite absolutely. A difference calculation unit 11 calculates differences in absolute position and velocity between the local and remote satellites. A relative navigation unit 12 estimates the relative position and velocity of the local satellite with respect to the remote satellite. A GPS receiver 7 having the same functions as the counterpart 5 is mounted in the remote satellite. A communication unit 8 having the same functions as the counterpart 6 is mounted in the remote satellite.

Next, the first embodiment will be described below. The GPS receiver 5 inversely diffuses a GPS signal received through a GPS antenna mounted on the local satellite according to a PRN code. The GPS receiver 5 thus interprets a navigation message. Moreover, the GPS receiver 5 locks the phase of a carrier on to that of a reference signal. The GPS receiver 5 then outputs GPS data. In the local satellite absolute navigation unit 9, the single positioning block 9b locates the local satellite independently according to the initial values output from the initial value calculation block 9a and the GPS data output from the GPS receiver 5 in the local satellite. In other words, the local satellite absolute navigation unit 9 estimates the position and velocity of the local satellite and a bias and drift caused by a receiver clock.

To begin with, four unknown variables including the position of the local satellite and the bias caused by the receiver clock are used to define a vector x and estimated so that the formula (1) will be satisfied.

$$H*(x-x0)=\Delta y \quad (1)$$

In the formula (1), x0 denotes one of initial values needed for single positioning, that is, the initial value of either of the estimated values of the position and the bias caused by the receiver clock. Δy denotes a difference between a pseudo distance ym specified in GPS data and a pseudo distance yh predicted from the ephemeris of a GPS satellite and x0. That is to say, Δy denotes a vector representing a predicted error of an observed quantity. H denotes an observed matrix. The i-th component yh_i of the vector yh is calculated as the sum of the distance between the i-th GPS satellite and the local satellite and the bias caused by the receiver clock according to the formula (2) below.

$$yh\_=|pG\_i-pCh|+bh \quad (2)$$

where pG_i denotes the position of the i-th GPS satellite derived from the ephemeris thereof, pCh denotes the initial value of the estimated value of the position of the local satellite, and bh denotes the initial value of the estimated value of a distance calculated by multiplying the bias caused by the receiver clock by the light velocity.

The partial matrix H_i that is the i-th row of the observed matrix H is calculated according to the formula (3).

$$H\_i=dyh\_i/dx \quad (3)$$

The right side of the formula (3) states partial differential of yh_i relative to x where x denotes a vector whose first, second, and third components represent pCh and whose fourth component represents bh.

Next, four unknown variables including the velocity of the local satellite and the drive caused by the receiver clock are estimated in the same manner as mentioned above. In this case, the initial value x0 needed for single positioning and included in the formula (1) is the initial value of either of the estimated values of the velocity and the drift caused by the receiver clock. Δy denotes a difference between a delta range ym specified in GPS data and a delta range yh predicted from the ephemeris of a GPS satellite and X0. That is to say, Δy denotes a vector representing a predicted error of an observed quantity. The i-th component yh_i of the vector yh is calculated as the sum of a difference in velocity between the i-th GPS satellite and the local satellite and the drift caused by the receiver clock. The elements of the matrix H are identical to those of the matrix employed for estimating the position of the local satellite and the bias caused by the receiver clock. For locating the local satellite independently, a measurement update flag is set to 1. Otherwise, the measurement update flag is reset to 0.

The communication unit 6 acquires GPS data, which has been received by the GPS receiver 7 mounted in the remote satellite, via the communication unit 8. The remote satellite absolute navigation unit 10 estimates the position and velocity of the remote satellite and the bias and drift caused by the GPS receiver clock. For the estimation, the remote satellite absolute navigation unit 10 analyzes the GPS data received by the GPS receiver 7 in the remote satellite according to the same procedure as the local satellite absolute navigation unit 9.

When the measurement update flag is set to 1, the difference calculation unit 11 calculates the relative position and velocity of the local satellite with respect to the remote satellite. For the calculation, the difference calculation unit 11 calculates the difference between the output of the local satellite absolute navigation unit 9 and the output of the remote satellite absolute navigation unit 10. The difference quantities are indicated with components expressed in a system of coordinates employed in absolute navigation.

Assume that the local satellite takes off from or lands on the remote satellite to make a rendezvous or the like. In this case, the local satellite is normally guided by controlling the relative position and velocity thereof using a system of coordinates fitted to the orbit of the remote satellite. The system of coordinates fitted to the orbit of the remote satellite is calculated from the output of the remote satellite absolute navigation unit 10. The difference quantities are then transformed into coordinates expressed in the orbital system of coordinates. Incidentally, the Hill system of coordinates is widely adopted as the orbital system of coordinates. According to the Hill system of coordinates, the -y axis is defined in the direction in which a right-hand screw advances when turned. Specifically, the right-hand screw is turned in the direction of a vector representing an angular momentum relative to the orbit, that is, an orbital direction perpendicular to the orbital plane. The z axis is defined in the direction of the center of the Earth, and the direction of the x axis is determined to establish a right-handed system. If the local satellite travels a circular orbit, the direction of the x axis coincides with the direction in which the orbit advances.

The relative navigation unit 12 integrates the previous estimated values of the relative position and velocity according to equations of motion expressing a relative movement of the local satellite with respect to the remote satellite. The relative navigation unit 12 thus works out current estimated values. When the measurement update flag is set to 1 and the difference calculation unit 11 has provided an output, the measurements are updated according to the flag and output. Thus, the precision in estimation is improved. Disturbances including an aerodynamic drag can thus be disregarded. When a target is travelling a circular orbit at an angular velocity ω, a chaser makes a relative movement satisfying the equations of motion expressing a relative movement (4).

$$xc(ts)=\Phi pp*xc(t0)+\Phi pv*vc(t0) \quad vc(ts)=\Phi vp*xc(t0)+\Phi vv*vc(t0) \quad (4)$$

where xc(t0) and xc(ts) denote vectors indicating the relative positions at the time instants t=t0 and t=ts according to the Hill system of coordinates. vc(t0) and vc(ts) denote vectors indicating the relative velocities at the time instants t=t0 and t=ts according to the Hill system of coordinates. Matrices Φpp, Φpv, Φvp, and Φvv are partial matrices of a state transition matrix. The elements of the partial matrices are provided as the formula (5).

$$\Phi pp = \begin{bmatrix} 1, & 0, & 6*(\theta-s) \\ 0, & c, & 0, \\ 0, & 0, & 4-3*c \end{bmatrix} \quad (5)$$

$$\Phi pv = \begin{bmatrix} (4*s-3*\theta)/\omega, & 0, & 2*(1-c)/\omega \\ 0, & s/\omega, & 0 \\ -2*(1-c)/\omega, & 0, & s/\omega \end{bmatrix}$$

$$\Phi vp = \begin{bmatrix} 0, & 0, & 6*\omega*(1-c) \\ 0, & -\omega*s, & 0 \\ 0, & 0, & 3*\omega*s \end{bmatrix}$$

$$\Phi vv = \begin{bmatrix} 4*c-3, & 0, & 2*s \\ 0, & c, & 0 \\ -2*s, & 0, & c \end{bmatrix}$$

$$s=\sin(\theta), \quad c=\cos(\theta), \quad \theta=\omega*(ts-t0)$$

For updating measurements at the measuring time instant t=ts, a difference between a vector xs and a vector ys is regarded as a predicted error. Herein, the component vectors of the vector xs represent the relative position and velocity predicted according to the formula (5). The component vectors of the vector ys represent the measurements of the relative position and velocity output from the difference calculation unit 11. Thereafter, a quantity of correction calculated by multiplying the predicted error by a gain matrix K is added to the vector xs. This is stated by the formula (6).

$$xs'=xs+K*(ys-xs) \tag{6}$$

where xs' denotes the estimates of the relative position and velocity obtained after the measurements thereof are updated.

As mentioned above, an artificial satellite navigation system in accordance with the first embodiment includes a GPS receiver, a communication unit, a local satellite absolute navigation unit, a remote satellite absolute navigation unit, a difference calculation unit, and a relative navigation unit. The communication unit helps communicate with another artificial satellite having a GPS receiver mounted therein. The local satellite absolute navigation unit estimates the position and velocity of the local satellite and a bias and drift caused by a receiver clock. The remote satellite absolute navigation unit estimates the position and velocity of the remote satellite and a bias and drift caused by a receiver clock. The difference calculation unit calculates differences in position and velocity from the output of the local satellite absolute navigation unit and the output of the remote satellite absolute navigation unit. The relative navigation unit estimates the relative position and velocity of the local satellite with respect to the remote satellite. The difference calculation unit outputs the differences that have been transformed into components expressed in a system of coordinated defined with reference to the orbit of the remote satellite. Based on the output, the relative navigation unit navigates the local satellite relatively. When a local satellite is located far from a remote satellite, no GPS satellite may be visible in common by the local satellite and remote satellite. Even in this case, the local satellite can be navigated absolutely using GPS satellites visible by the local satellite and remote satellite respectively. The local satellite can be navigated relatively based on the differences in position and velocity between the local and remote satellites. The navigation system can be employed continuously irrespective of whether the distance to the remote satellite is large or small.

Second Embodiment

Figure 2:
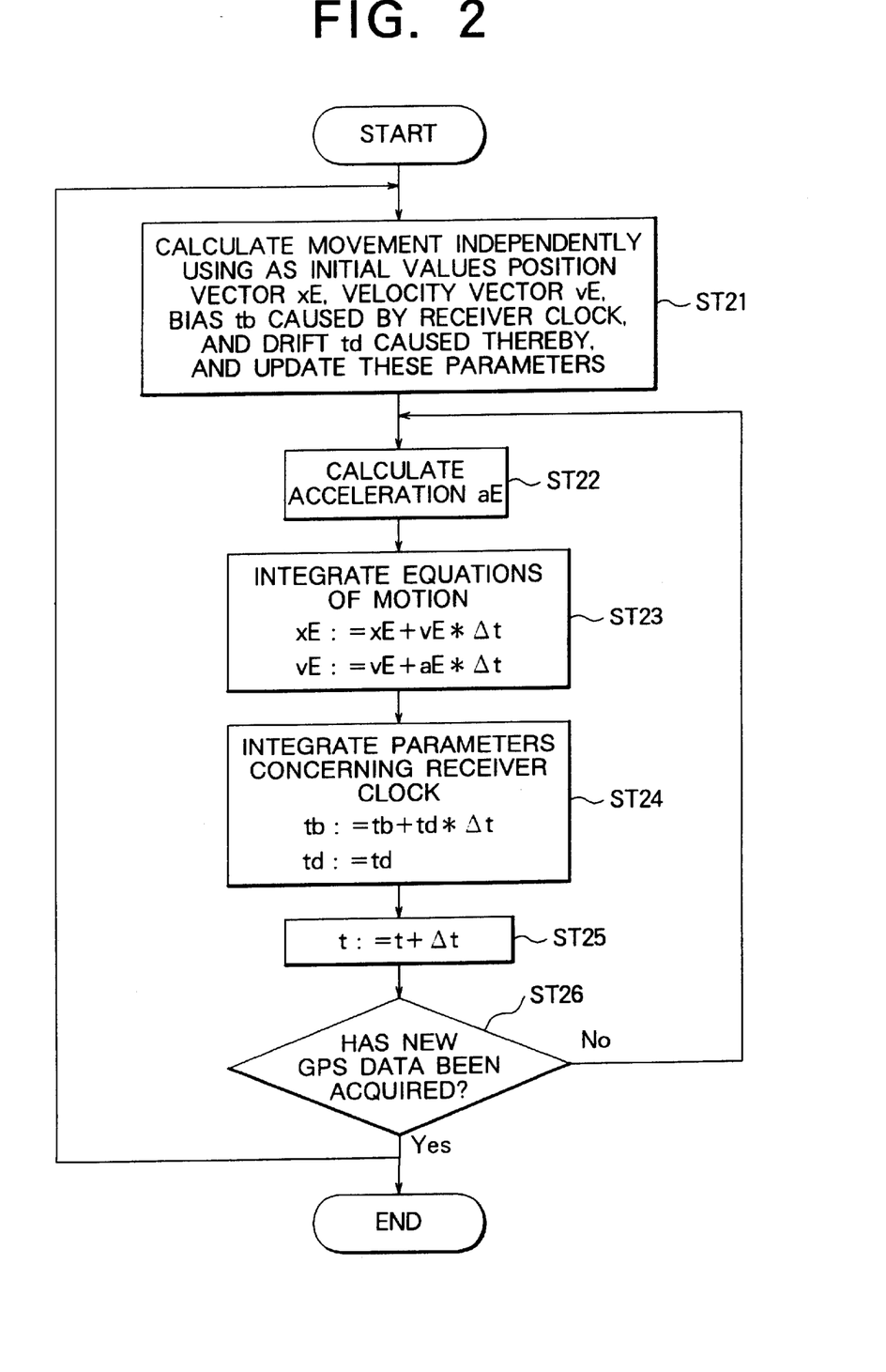
FIG. 2 is a flowchart describing the actions of an initial value calculation block in a local satellite absolute navigation unit or remote satellite absolute navigation unit included in an artificial satellite navigation system in accordance with the second embodiment of the present invention.

FIG. 2 is a flowchart describing a procedure of calculating initial values when the initial value calculation block 9a of the local satellite absolute navigation unit 9 or the initial value calculation block 10a of the remote satellite absolute navigation unit 10, which is included in the artificial satellite navigation system of the first embodiment, is realized inside a computer. The same procedure is adopted for the local and remote satellite absolute navigation units. The procedure will therefore be described in relation to the local satellite absolute navigation unit. The arithmetic operations to be performed after the initial values are given are calculations of the expressions (1) to (3) in the first embodiment.

Assume that the results of single positioning performed by the local satellite absolute navigation unit at a time instant t=t0 are as follows: a position vector and a velocity vector expressed in a system of coordinates fitted to the Earth are xE and vE respectively, a bias caused by a receiver clock is tb, and a drift caused by the receiver clock is td. A vector representing an angular velocity at which the Earth rotates is ωE. A position vector xI and velocity vector vI whose components are expressed in an inertial system of coordinates having the center of the Earth as the origin are calculated as follows:

$$xI=CEI*xE, vI=CEI*(vE+\omega E \times xE) \tag{7}$$

where CEI denotes a matrix used to transform coordinates from the system of coordinates fitted to the Earth to the inertial system of coordinates, and a×b denotes an arithmetic operation of working out the outer product of a vector a and a vector b.

In the system of coordinates fitted to the Earth, equations of motion indicating a relative position of a chaser are given as the formula (8). Herein, uE denotes an extraneous force vector representing control force or the like and having components thereof transformed into those expressed in the system of coordinates fitted to the Earth. μ denotes a constant representing a gravity of the Earth. d0/dt denotes an operation of differentiating each component over time t.

$$dxE/dt=vE, dvE/dt=aE \ aE=-\mu*xE/|xE|3-\omega E \times (\omega E \times xE) -2*\omega E \times vE+uE \tag{8}$$

In the inertial system of coordinates, the equations of motion indicating the relative position of the chaser are given as the formula (9). Herein, uI denotes an extraneous force such as a control force expressed according to the inertial system of coordinates.

$$dxI/dt=vI, dvI/dt=aI \ aI=-\mu*xI/|x|^3+uI \tag{9}$$

The initial value calculation block 9a in the local satellite absolute navigation unit 9 integrates the equations of motion until new GPS data is acquired, and estimates the position and velocity of the local satellite. As for a bias and drift caused by a clock in the receiver, the drift is regarded to be constant, and the bias is considered to vary by a value calculated by multiplying the drift by an elapsed time. A description will be made of integration of the equations of motion according to the system of coordinates fitted to the Earth. The same applies to the inertial system of coordinates except that the number of times of coordinate transformation increases.

At step ST21 in FIG. 2, new GPS data is acquired. A movement made by the local satellite is calculated independently using a position vector xE, a velocity vector vE, a bias caused by the receiver clock tb, and a drift td caused by the receiver clock td as initial values. The position vector xE, velocity vector vE, bias tb caused by the receiver clock, and drift td caused by the receiver are updated.

At step ST22, an acceleration vector aE is calculated using the formula (8).

At step ST23, the equations of motion are numerically integrated as expressed with the formula (10).

$$xE:=xE+vE*\Delta t, vE:=vE+aE*\Delta t \tag{10}$$

where Δt denotes a time width at intervals of which the position vector and velocity vector are integrated, and := denotes substitution.

At step ST24, the bias and drift caused by the receiver clock are numerically integrated.

$$tb:=tb+td*\Delta t, td:=td \tag{11}$$

At step ST25, the time instant t is updated to t+Δt.

If new GPS data has been acquired at step ST26, control is returned to step ST21. If not, control is returned to step ST22.

According to the artificial satellite navigation system of the second embodiment, the local satellite absolute navigation unit or remote satellite absolute navigation unit uses values, which are predicted by distributing the results of previous single positioning according to the equations of motion, as the initial values of parameters needed for single positioning. Compared with calculation not using the equations of motion, expansion of an estimation error deriving from numerical integration can be suppressed low.

Third Embodiment

Figure 3:
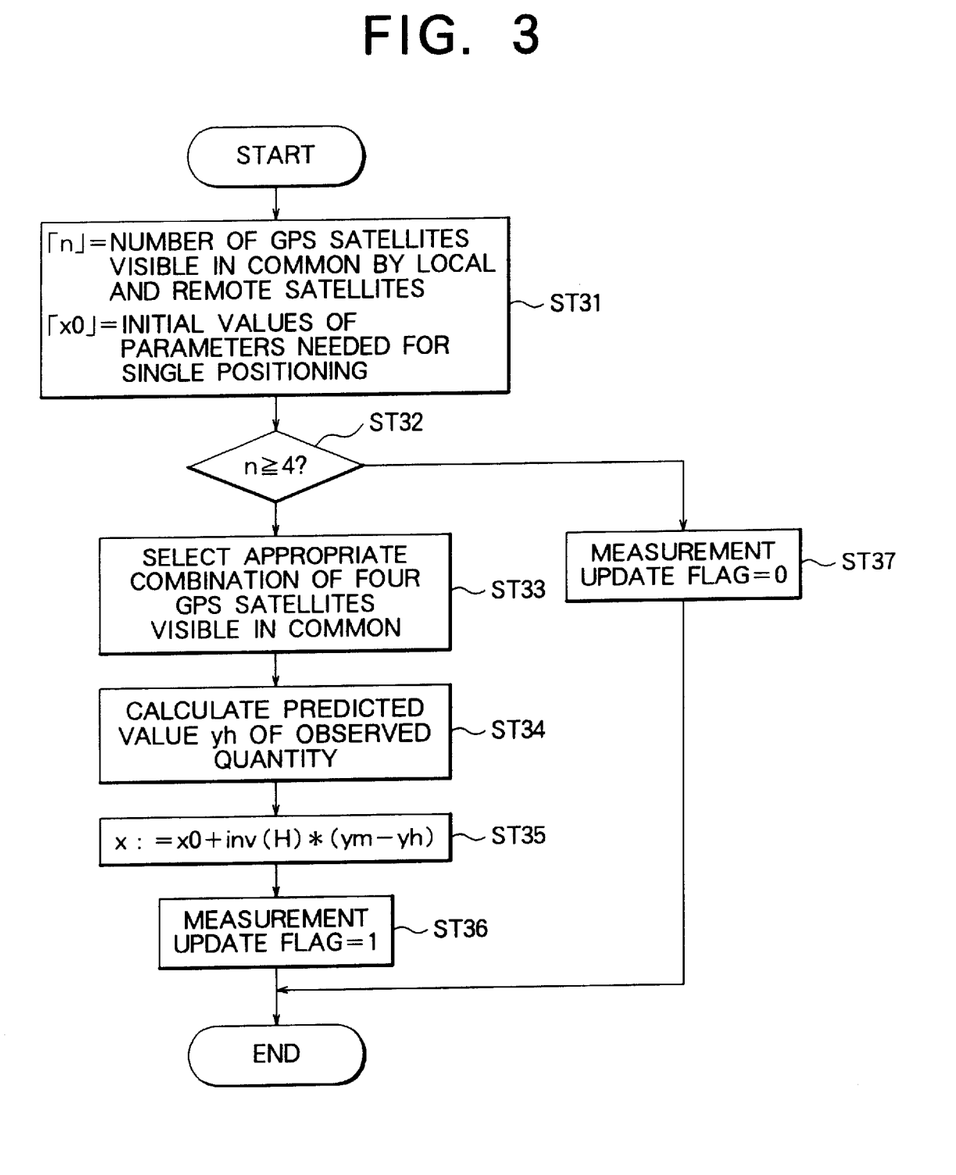
FIG. 3 is a flowchart describing the actions of a local satellite absolute navigation unit or remote satellite absolute navigation unit included in an artificial satellite navigation system in accordance with the third embodiment of the present invention.

FIG. 3 is a flowchart describing the solution of the formula (1) employed when the single positioning block 9b in the local satellite absolute navigation unit 9 or the single positioning block 10b in the remote satellite absolute navigation unit 10, which is included in the artificial satellite navigation system of the first embodiment, is realized inside a computer. The same procedure is adopted for the local satellite absolute navigation unit and the remote satellite absolute navigation unit alike. The procedure will therefore be described in relation to the local satellite absolute navigation unit.

In the formula (1), the number of unknown variables is four. The number of observed quantities is not always equal to four depending on how GPS satellites are seen. FIG. 3 describes a method of, when the number of GPS satellites visible in common by the local and remote satellites is four or more, selecting an appropriate combination of four satellites and locating the local and remote satellites independently. According to the method, when the number of GPS satellites is less than four, locating the local and remote satellites independently will not be carried out.

At step ST31 in FIG. 3, the number of GPS satellites visible in common by the local satellite and remote satellite is specified in n. The initial values of parameters needed for single positioning are specified one by one in x0.

If it is found at step ST32 that n is equal to or larger than 4, control is passed to step ST33. Otherwise, control is passed to step ST37.

If n is equal to or larger than 5, an appropriate combination of four GPS satellites visible in common is selected at step ST33. The observed matrix H in the formula (1) varies depending on the combination. The combination is presumably selected so that the sum of inverse numbers at singular points in the matrix H will be a maximum. This is equivalent to selection of a combination minimizing a so-called GDOP. The observed matrix H is calculated using the formula (3).

At step ST34, a predicted value yh of an observed quantity is calculated according to the formula (2).

At step ST35, a difference between the observed quantity ym and the predicted value yh is multiplied by an inverse matrix of the observed matrix H. A resultant quantity is added as a quantity of correction to the initial value x0. Thus, a new estimated value x is worked out.

At step ST36, the measurement update flag is set to 1 and the estimated value x is output. The procedure is then terminated.

At step ST37, the measurement update flag is reset to 0, and the procedure is terminated.

According to the artificial satellite navigation system of the third embodiment, the local satellite absolute navigation unit or remote satellite absolute navigation unit calculates the position and velocity of the local or remote satellite and the bias and drift caused by the receiver in consideration of the geometric positional relationships between GPS satellites and the local or remote satellite. The calculation is simple. Compared with the method of using the Kalman filter or any other navigation filter requiring a large quantity of calculation, this method can be implemented easily.

Fourth Embodiment

Figure 4:
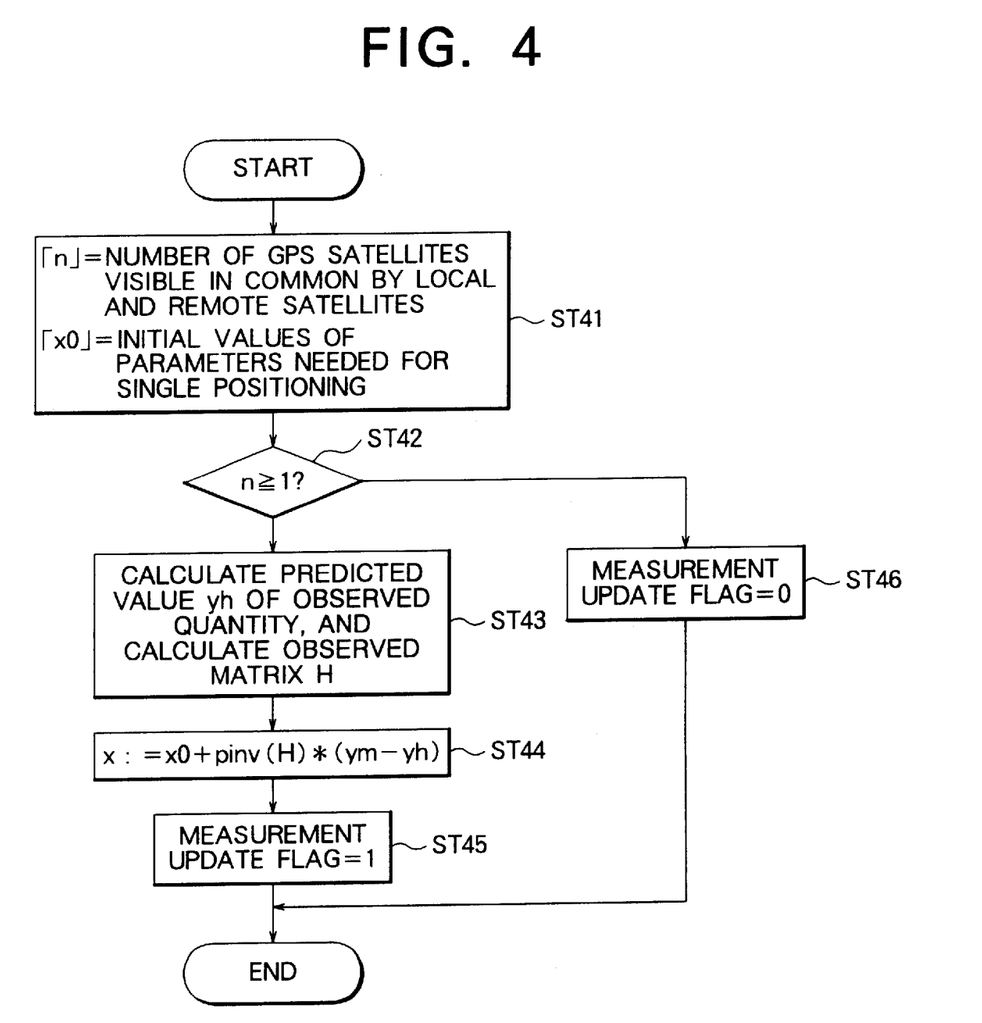
FIG. 4 is a flowchart describing the actions of an single positioning block in a local satellite absolute navigation unit or remote satellite absolute navigation unit included in an artificial satellite navigation system in accordance with the fourth embodiment of the present invention.

FIG. 4 is a flowchart describing the solution of the formula (1) employed when the single positioning unit 9b in the local satellite absolute navigation unit 9 or the single positioning unit 10b in the remote satellite absolute navigation unit 10, which is included in the artificial satellite navigation system of the first embodiment, is realized inside a computer. The same procedure is adopted for both the local satellite absolute navigation unit and the remote satellite absolute navigation unit alike. The procedure will be described in relation to the local satellite absolute navigation unit.

In the formula (1), the number of unknown variables is four. The number of observed quantities is not always equal to four depending to how GPS satellites are seen. FIG. 4 describes a method. According to the method, when the number of GPS satellites visible in common by the local and remote satellites is equal to or larger than 1, the local and remote satellites are independently located using a pseudo inverse matrix of the observed matrix H. When no GPS satellite is visible in common, locating the local and remote satellites independently will not be carried out.

In general, x denotes an m-order unknown vector, y denotes an n-order observed quantity vector, and H denotes an n by m-order observed matrix.

$$y = H^* x \qquad (12)$$

An optimal solution x" of the formula (12) is given by the formula (13).

$$x'' = \text{pinv}(H)^* y \qquad (13)$$

where pinv( ) denotes an operation of calculating a pseudo inverse matrix of any matrix. The obtained x" satisfies the relationship expressed by the formula (14).

$$|y - H^* x''| \to \text{minimum} \qquad (14)$$

Any matrix having n rows and m columns can be, as already known, decomposed as expressed by the formula (15). For further information of the formula (15), refer to "Linear Algebra and its Application" written by G. Strung and translated by Akira Inoue (Sangyo Tosho, pp.156–157).

$$H = Q1^* D^* Q2^T \qquad (15)$$

where Q1 denotes an orthogonal matrix of n rows by n columns, Q2 denotes an orthogonal matrix of m rows by m columns, and D denotes a matrix in which the first r elements on the principal diagonal have positive values (singular points) and the other elements all have zero. r denotes the order of the matrix H. The superscript T denotes an operation of transposing a matrix. A pseudo inverse matrix of the matrix H is expressed by the formula (16).

$$\text{pinv}(H) = Q2^* D^{+*} Q^T \qquad (16)$$

where the superscript +denotes an operation of working out inverse numbers of non-zero components alone.

At step ST41 in FIG. 4, the number of GPS satellites visible in common by the local and remote satellites is specified in n. The initial values of parameters needed for single positioning are specified one by one in x0.

If it is found at step ST42 that n is equal to or larger than 1, control is passed to step ST43. Otherwise, control is passed to step ST46.

At step ST43, the predicted value yh of an observed quantity is calculated according to the formula (2). An observed matrix H is calculated according to the formula (3).

At step ST44, a difference between the observed quantity ym and predicted value yh is multiplied by a pseudo inverse matrix of the observed matrix H. The resultant quantity is added as a quantity of correction to the initial value x0. This results in a new estimated quantity x.

At step ST45, the measurement update flag is set to 1, and the estimated quantity x is output.

At step ST46, the measurement update flag is reset to 0 and the procedure is terminated.

According to the artificial satellite navigation system of the fourth embodiment, the local satellite absolute navigation unit or remote satellite absolute navigation unit uses a pseudo inverse matrix to calculate the values of parameters needed for single positioning. Compared with the method in which when the number of GPS satellites visible in common is equal to or larger than five, the number of GPS satellites is restricted to four, location can be achieved with high precision. Moreover, even when the number of GPS satellites visible in common is less than four and equal to or larger than one, measurements can be updated. Compared with the method in which when the number of GPS satellite visible in common is less than four, measurements are not updated, deterioration of precision in observation can be suppressed low.

A description has been made of the method of independently locating the local or remote satellite when the number of GPS satellites is equal to or larger than one. Needless to say, the same advantages as those mentioned above can be provided even when the threshold value of the number of GPS satellites visible in common may not be one but two or three.

Fifth Embodiment

Figure 5:
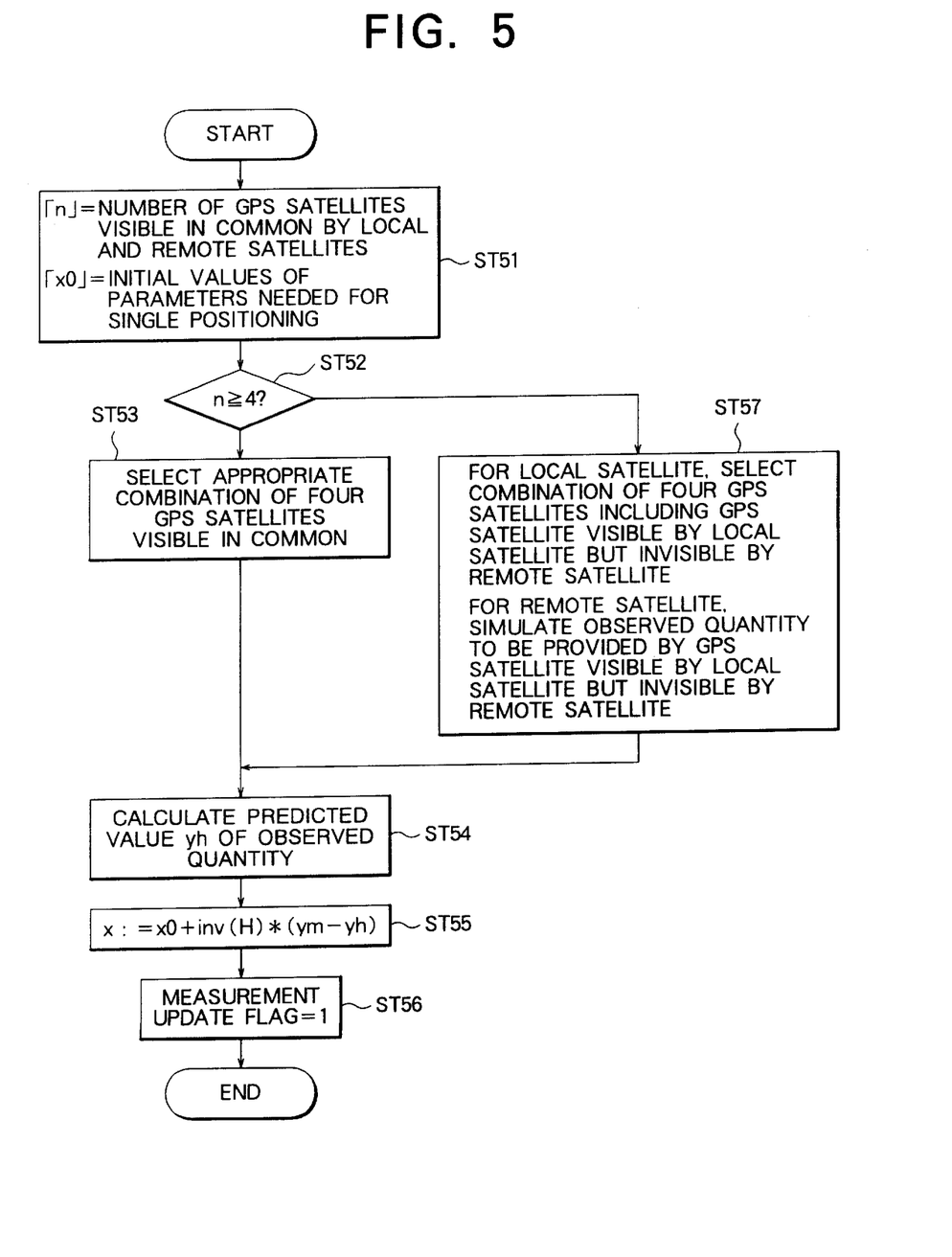
FIG. 5 is a flowchart describing the actions of an single positioning block in a local satellite absolute navigation unit or remote satellite absolute navigation unit included in an artificial satellite navigation system in accordance with the fifth embodiment of the present invention.

FIG. 5 is a flowchart describing the solution of the formula (1) employed when the single positioning block 9b in the local satellite absolute navigation unit 9 or the single positioning block 10b in the remote satellite absolute navigation unit 10, which is included in the artificial satellite navigation system of the first embodiment, is realized inside a computer. For brevity's sake, four GPS satellites shall be visible by the local satellite.

In the formula (1), the number of unknown variables is four. The number of observed quantities is not always equal to four depending on how GPS satellites are seen. According to a method described in FIG. 5, when the number of GPS satellites visible in common by the local and remote satellites is equal to or larger than four, an appropriate combination of four satellites is selected. The local and remote satellites are then located independently. When the number of GPS satellites visible in common is less than four, a signal to be received from a GPS satellite visible by the local satellite but invisible by the remote satellite is simulated using the initial values of parameters needed to independently locate the remote satellite. The number of GPS satellites visible in common is thus made four. The local satellite is then located independently.

At step ST51 in FIG. 5, the number of GPS satellites visible in common by the local satellite and remote satellite is specified in n. The initial values of the parameters needed for single positioning are specified one by one in x0.

If it is found at step ST52 that n is equal to or larger than four, control is passed to step ST53. Otherwise, control is passed to step ST57.

If n is equal to or larger than five, an appropriate combination of four GPS satellites visible in common is selected at step ST53. The observed matrix H is calculated according to the formula (3).

At step ST54, the predicted value yh of an observed quantity is calculated according to the formula (2).

At step ST55, a difference between the observed quantity ym and the predicted value yh is multiplied by an inverse matrix of the observed matrix H. The resultant quantity is added as a quantity of correction to the initial value x0. This results in a new estimated quantity x.

At step ST56, the measurement update flag is set to 1 and the estimated quantity x is output. The procedure is then terminated.

At step ST57, when the local satellite is concerned, four GPS satellites made up of GPS satellites visible in common and a GPS satellite visible by the local satellite alone are selected as a combination of four GPS satellites. For making the combination by adding a GPS satellite, it is conceivable to select a combination that maximizes the sum of inverse numbers at singular points in the observed matrix H. For the remote satellite, the GPS satellites selected for locating the local satellite are employed. Since a GPS satellite visible by the local satellite but invisible by the remote satellite is included, the observed quantity provided by the GPS satellite is equalized to the predicted value calculated using the formula (2). A signal to be sent from the GPS satellite invisible by the remote satellite is simulated. Control is then passed to step ST54.

At step ST57, a signal to be sent from a GPS satellite visible by the local satellite but invisible by the remote satellite is simulated. Alternatively, a signal to be sent from a GPS satellite visible by the remote satellite but invisible by the local satellite and actually measured may be substituted for the signal. In particular, when the number of GPS satellites visible in common is zero, actually measured signals should be used to independently locate the local and remote satellite. Herein, the signals may be sent from GPS satellites visible by the local satellite and remote satellite respectively, though the GPS satellites may not be visible in common. This is because higher precision is presumably expected.

Moreover, a signal to be sent from a GPS satellite having a virtual position and velocity may be simulated by the local satellite and remote satellite respectively. Even when less than four GPS satellites are visible by the local satellite and remote satellite, the number of GPS satellites can be made apparently four. Consequently, the same advantages as those mentioned above can be provided without fail.

According to the artificial satellite navigation system of the fifth embodiment, when the number of GPS satellites visible in common by the local satellite and remote satellite is less than four, the local satellite absolute navigation unit or remote satellite absolute navigation unit simulates a signal to be received from an actually invisible GPS satellite. The number of GPS satellites visible in common is thus made apparently four. The local and remote satellites are then located independently. Irrespective of the number of GPS satellites visible in common, the number of GPS satellites employed in single positioning is always four. Compared with the method employing a pseudo inverse matrix, this method requires a simpler program.

Sixth Embodiment

Figure 6:
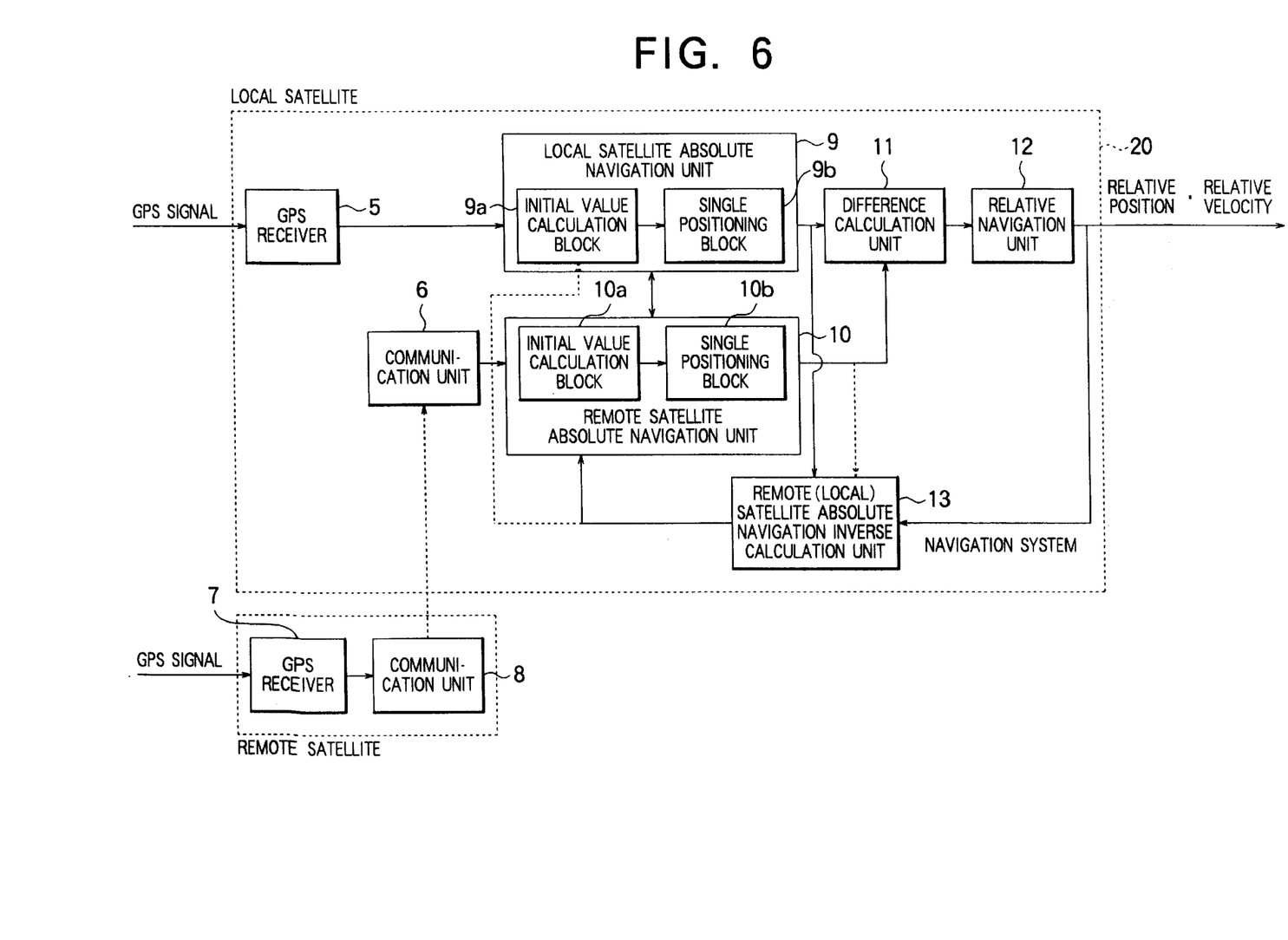
FIG. 6 is a block diagram showing the configuration of an artificial satellite navigation system in accordance with the sixth embodiment of the present invention.

FIG. 6 is a block diagram showing the configuration of an artificial satellite navigation system in accordance with the sixth embodiment of the present invention. In FIG. 6, there is shown a remote satellite absolute navigation inverse calculation unit 13. The remote satellite absolute navigation inverse calculation unit 13 inversely calculates the estimated values of the absolute position and velocity of a remote satellite from the output of the relative navigation unit 12 and the output of the local satellite absolute navigation unit 9.

The actions of the sixth embodiment will be described below. The GPS receiver 5 inversely diffuses a GPS signal received through a GPS antenna mounted in the local satellite according to a PRN code. The GPS receiver 5 interprets a navigation message and locks the phase of a carrier on to that of a reference signal. Finally, the GPS receiver 5 outputs GPS data. The local satellite absolute navigation unit 9 locates the local satellite independently according to the GPS data output from the GPS receiver 5 in the local satellite.

The communication unit 6 acquires GPS data output from the GPS receiver 7 mounted in the remote satellite via the communication unit 8. The single positioning block 10b in the remote satellite absolute navigation unit 10 uses the output of the initial value calculation block 10a as initial values. Based on the GPS data received by the GPS receiver 7 in the remote satellite, the single positioning block 10b estimates the position and velocity of the remote satellite and a bias and drift caused by a clock in the GPS receiver in the remote satellite. At this time, the single positioning block 10 adopts the same method as the counterpart in the local satellite absolute navigation unit 9.

If a state persists in which only a small number of GPS-satellites is visible by the GPS receiver 7 in the remote satellite, precision in navigation performed by the remote satellite absolute navigation unit 10 deteriorates. The remote satellite absolute navigation inverse calculation unit 13 inversely calculates the position and velocity of the remote satellite by adding the relative position and velocity of the local satellite to the position and velocity of the local satellite. Herein, the relative position and velocity of the local satellite are included in the output of the relative navigation unit 12. The position and velocity of the local satellite are included in the output of the local satellite absolute navigation unit 9. The position and velocity of the remote satellite are output as the initial values of parameters needed for single positioning to the initial value calculation block 10a in the remote satellite absolute navigation unit 10.

When the measurement update flag is set to 1, the difference calculation unit 11 works out the difference between the output of the local satellite absolute navigation unit 9 and the output of the remote satellite absolute navigation unit 10. The difference calculation unit 11 thus calculates the relative position and velocity of the local satellite with respect to the remote satellite.

The relative navigation unit 12 calculates current estimated values by integrating the previously estimated values of the relative position and velocity. Specifically, the previously estimated values of the relative position and velocity are integrated based on equations of motion expressing a relative movement of the local satellite with respect to the remote satellite. When the measurement update flag is set to 1 and the difference calculation unit 11 provides an output, the measurements are updated based on the measurement update flag and the output of the difference calculation unit. This results in improved precision in estimation.

As mentioned above, according to the artificial satellite navigation system of the sixth embodiment, the remote satellite absolute navigation unit inversely calculates the position and velocity of the remote satellite from the output of the local satellite absolute navigation unit and the output of the relative navigation unit. The position and velocity of the remote satellite are used as the initial values of parameters needed for single positioning. A state may persist for a long time in which only a small number of GPS satellites are visible by the GPS receiver in the remote satellite. Even in the state, deterioration of precision in location performed by the remote satellite absolute navigation unit can be suppressed low.

For convenience' sake, according to the described method, the position and velocity of the remote satellite are inversely calculated from the output of the local satellite absolute navigation unit and the output of the relative navigation unit. The position and velocity of the remote satellite are used as the initial values of the parameters necessary for the remote satellite absolute navigation unit to independently locate the remote satellite. However, the precision in navigation performed by the local satellite absolute navigation unit may be expected to be higher than the precision in navigation performed by the remote satellite absolute navigation unit. In this case, the relationship between the local satellite and remote satellite may be reversed. As indicated with a dashed line in FIG. 6, the local satellite absolute navigation inverse calculation unit may inversely calculate the position and velocity of the local satellite from the output of the remote satellite absolute navigation unit and the output of the relative navigation unit. The position and velocity of the local satellite may be used as the initial values of parameters necessary for the local satellite absolute navigation unit to independently locate the local satellite. This method can naturally provide the same advantages as those mentioned above.

As described so far, according to an artificial satellite navigation system and method of the present invention, the artificial satellite navigation system includes a GPS receiver and a communication unit helping communicate with another artificial satellite that has a GPS receiver mounted therein. The artificial satellite navigation system comprises a local satellite absolute navigation unit, a remote satellite absolute navigation unit, a difference calculation unit, and a relative navigation unit. The local satellite absolute navigation unit estimates the position and location of the local satellite and a bias and drift caused by a clock in the receiver. The remote satellite absolute navigation unit estimates the position and velocity of the remote satellite and a bias and drive caused by a clock in the receiver. The difference calculation unit calculates differences in position and velocity from the output of the local satellite absolute navigation unit and the output of the remote satellite absolute navigation unit. The relative navigation unit estimates the relative position and velocity of the local satellite with respect to the remote satellite. The difference calculation unit outputs the differences that have been transformed into components expressed in a system of coordinates defined with reference to the orbit of the remote satellite. Based on the output, the relative navigation unit navigates the local satellite relatively. The artificial satellite navigation system and method can be adopted irrespective of whether the local satellite is located far from the remote satellite or near it.

Moreover, according to an artificial satellite navigation system and method of the present invention, as described previously, an initial value calculation block in a local satellite absolute navigation unit or an initial value calculation block in a remote satellite absolute unit provides values, which are predicted by distributing the results of previous single positioning according to equations of motion, as the initial values of parameters needed for single positioning. Compared with a method not using the equations of motion, this method has the advantage of suppressing expansion of an error in estimation deriving from numerical integration.

Moreover, according to an artificial satellite navigation system and method of the present invention, as mentioned above, an single positioning block in a local satellite absolute navigation unit or an single positioning block in a remote satellite absolute navigation unit calculates the position and velocity of the local or remote satellite and a bias and drift occurring in a receiver in consideration of the geometric positional relationships between GPS satellites and the local or remote satellite. The calculation is very simple. Compared with a method using the Kalman filter or any other navigation filter requiring a large quantity of calculation, this method is easy to implement.

Furthermore, according to an artificial satellite navigation system and method of the present invention, as described previously, an single positioning block in a local satellite absolute navigation unit or an single positioning block in a remote satellite absolute navigation unit uses a pseudo inverse matrix to calculate parameters needed for single positioning. Compared with a method in which when the number of GPS satellites visible in common is equal to or more than five, the number of GPS satellites is restricted to four, this method can ensure high-precision location. Even when the number of GPS satellites is less then four and equal to or larger than one, measurements can be updated.

Furthermore, according to an artificial satellite navigation system and method of the present invention, as described previously, when the number of GPS satellites visible in common by a local satellite and remote satellite is less than four, an single positioning block in a remote satellite absolute navigation unit or an single positioning block in a remote satellite absolute navigation unit simulates a signal to be received from an actually invisible GPS satellite. Thus, the number of GPS satellites visible in common is made apparently four. The local and remote satellites are then located independently. The number of GPS satellites used for single positioning is always four irrespective of the number of GPS satellites visible in common. Compared with the method using the pseudo inverse matrix, this method has the advantage that a program required is simple.

Furthermore, according to an artificial satellite navigation system and method of the present invention is, as mentioned above, an initial value calculation block in a remote satellite absolute navigation unit inversely calculates the position and velocity of a remote satellite from the output of a local satellite absolute navigation unit and the output of a relative navigation unit. The calculated position and velocity are used as the initial values of parameters needed for single positioning. A state may persist for a long time in which only a small number of GPS satellites are visible by a GPS receiver in the remote satellite. Even in this case, deterioration of precision in location performed by the remote satellite absolute navigation unit can be suppressed low.

Moreover, precision in navigation performed by the local satellite absolute navigation unit may be expected to be higher than precision in navigation performed by the remote satellite absolute navigation unit. In this case, the relationship between local and remote satellites is reversed. A local satellite absolute navigation inverse calculation unit inversely calculates the position and velocity of the local satellite from the output of the remote satellite absolute navigation unit and the output of the relative navigation unit. The calculated position and velocity may be used as the initial values of parameters necessary for the local satellite absolute navigation unit to independently locate the local satellite. The same advantages as those mentioned above can still be provided.

What is claimed is:

1. An artificial satellite navigation system comprising:
   a first global positioning system (GPS) receiver for receiving GPS signals;
   a communication unit for communicating with a remote satellite and including a second GPS receiver;
   a local satellite absolute navigation unit for receiving a signal from said first GPS receiver, and estimating position and velocity of a local satellite and bias and drift caused by a clock in said first GPS receiver;
   a remote satellite absolute navigation unit for receiving a signal from said communication unit, and estimating the position and velocity of a remote satellite and bias and drift caused by a clock in said second GPS receiver;
   a difference calculation unit for calculating differences in position and velocity from the output of said local satellite absolute navigation unit and the output of said remote satellite absolute navigation unit; and
   a relative navigation unit for estimating the relative position and velocity of the local satellite with respect to the remote satellite, wherein said difference calculation unit outputs the differences expressed in a system of coordinates defined with reference to the remote satellite and said relative navigation unit relatively navigates the local satellite according to the output of said difference calculation unit.

2. The artificial satellite navigation system according to claim 1 wherein each of said local satellite absolute navigation unit and said remote satellite absolute navigation unit includes a single positioning block for calculating the position and velocity of the local and remote satellites and the bias and drift occurring in said first GPS receiver, and an initial value calculation block for calculating the initial values of the position velocity, said initial value calculation unit providing values predicted by results of previous single positioning according to equations of motion, as the initial values of the position and velocity needed for single positioning.

3. The artificial satellite navigation system according to claim 1 wherein each of said local satellite absolute navigation unit and said remote satellite absolute navigation unit includes a single positioning block for calculating the position and velocity of the local and remote satellites and the bias and drift occurring in said first GPS receiver considering geometric positional relationships between satellites and the local and remote satellites, and an initial value calculation unit for calculating initial values of the position and velocity, the single positioning block independently locating one of the local and remote satellites according to the output of the initial value calculation block and the output of one of said first GPS receiver and said communication unit.

4. The artificial satellite navigation system according to claim 1 wherein each of said local satellite absolute navigation unit and said remote satellite absolute navigation unit includes a single positioning block for calculating the position and velocity of the local and remote satellites and the bias and drift occurring in said first GPS receiver, and an initial value calculation block for calculating the initial values of the position and velocity and the single positioning block uses a pseudo inverse matrix to calculate the position and velocity needed for single positioning.

5. The artificial satellite navigation system according to claim 1 wherein each of said local satellite absolute navigation unit and said remote satellite absolute navigation unit includes a single positioning block for calculating the position and velocity of the local and remote satellites and the bias and drift occurring in said first GPS receiver, and an initial value calculation block for calculating the initial values of the position and velocity when fewer than four GPS satellites are commonly visible to the local and remote satellites, the single positioning block simulates a signal to be received from another GPS satellite that is invisible and thus makes four apparently commonly visible GPS satellites, and the single positioning block then independently locates one of the local and remote satellites.

6. The artificial satellite navigation system according to claim 1, further comprising a remote satellite absolute navigation inverse calculation unit for inversely calculating the position and velocity of the remote satellite from the output of said local satellite absolute navigation unit and the output of said relative navigation unit, each of said local satellite absolute navigation unit and said remote satellite absolute navigation unit including a single positioning block for calculating the position and velocity of one of the local and remote satellites and the bias and drift occurring in said first GPS receiver, and an initial value calculation block for calculating initial values of position and velocity and the initial value calculation block in said remote satellite absolute navigation unit provides values calculated by said remote satellite absolute navigation inverse calculation unit as the initial values of the position and velocity needed for single positioning.

7. The artificial satellite navigation system according to claim 1, further comprising a local satellite absolute navigation inverse calculation unit for inversely calculating the position and velocity of the local satellite from the output of said remote satellite absolute navigation unit and the output of said relative navigation unit, each of said local satellite absolute navigation unit and said remote satellite absolute navigation unit including a single positioning block for calculating the position and velocity of one of the local and remote satellites and the bias and drift occurring in said first GPS receiver, and an initial value calculation unit for calculating initial values of position and velocity and the initial value calculation block in said local satellite absolute navigation unit provides values calculated by said local satellite absolute navigation inverse calculation unit as the initial values of the position and velocity needed for single positioning.

8. A method for navigating a local satellite having a first GPS receiver receiving GPS signals through a GPS receiver and communicating with a remote satellite that has a second GPS receiver, comprising:

estimating the position and velocity of the local satellite and a bias and drift caused by a clock in the first GPS receiver according to a received GPS signal;

estimating the position and velocity of the remote satellite and bias and drift caused by a clock in the second GPS receiver according to a signal received from the remote satellite;

calculating differences in position and velocity from the estimates of position and drift of said local satellite and said remote satellite; and estimating the relative position and velocity of the local satellite with respect to the remote satellite from the differences in position and velocity, wherein the differences are transformed into components expressed in a system of coordinates defined with reference to the remote satellite, and the local satellite is relatively navigated according to the estimates of position and drift.

9. The artificial satellite navigation method according to claim 8, wherein each of estimating the position and drift of the local satellite and of the remote satellite includes a single positioning step of calculating the position and velocity of one of the local and remote satellites and bias and drift occurring in the first GPS receiver, and calculating initial values of the position and velocity, and, values predicted by distributing previous single positioning according to equations of motion are provided as the initial values of the position and velocity needed for single positioning.

10. The artificial satellite navigation method according to claim 8, wherein each of estimating the position and drift of the local satellite and of the remote satellite includes a single positioning step of calculating the position and velocity of one of the local and remote satellites and bias and drift occurring in the first GPS receiver, considering geometric positional relationships between GPS satellites and one of the local and remote satellites, and calculating the initial values of the position and velocity, and, based on the initial values and one of the received GPS signal and a signal sent from the remote satellite, independently locating the local or remote satellite in the single positioning step.

11. The artificial satellite navigation method according to claim 8, wherein each of estimating the position and drift of the local satellite and of the remote satellite includes a single positioning step of calculating the position and velocity of one of the local and remote satellites and bias and drift occurring in the first GPS receiver, and calculating initial values of and, in the single positioning step, using a pseudo inverse matrix to calculate the position and velocity needed for single positioning.

12. The artificial satellite navigation method according to claim 8, wherein, each of estimating the position and drift of the local satellite and of the remote satellite includes a single positioning step of calculating the position and velocity of one of the local and remote satellites and bias and drift occurring in the first GPS receiver, and calculating initial values of and, in the single positioning step, when fewer than four GPS satellites are commonly visible to the local and remote satellites, simulating a signal to be received from a GPS satellite so that four GPS satellites are apparently commonly visible and one of the local and remote satellites is independently located.

13. The artificial satellite navigation method according to claim 8, further comprising inversely calculating the position and velocity of the remote satellite from each of estimating of the position and velocity of the local satellite independently and relative to the remote satellite using a single positioning step of calculating the position and velocity of one of the local and remote satellites and the bias and drift occurring in the first GPS receiver, and calculating the initial values of the position and velocity and, upon calculating the initial values of the remote satellite, receiving the values calculated in inversely calculating the position and velocity of the remote satellite as the initial values needed for single positioning.

14. The artificial satellite navigation method according to claim 8, further comprising inversely calculating the position and velocity of the local satellite from each of estimating of the position and velocity of the local satellite independently and relative to the remote satellite using a single positioning step of calculating the position and velocity of one of the local and remote satellites and the bias and drift occurring in the first GPS receiver, and calculating the initial values of the position and velocity and, upon calculating the initial values of the local satellite, receiving the values calculated in inversely calculating the position and velocity of the remote satellite as the initial values needed for single positioning.

* * * * *